Dec. 25, 1951 G. V. LILJESTRÖM 2,580,031
ACCUMULATOR ENGAGING MECHANISM FOR ADDING
AND SUBTRACTING MACHINES
Filed Feb. 18, 1948 4 Sheets-Sheet 1
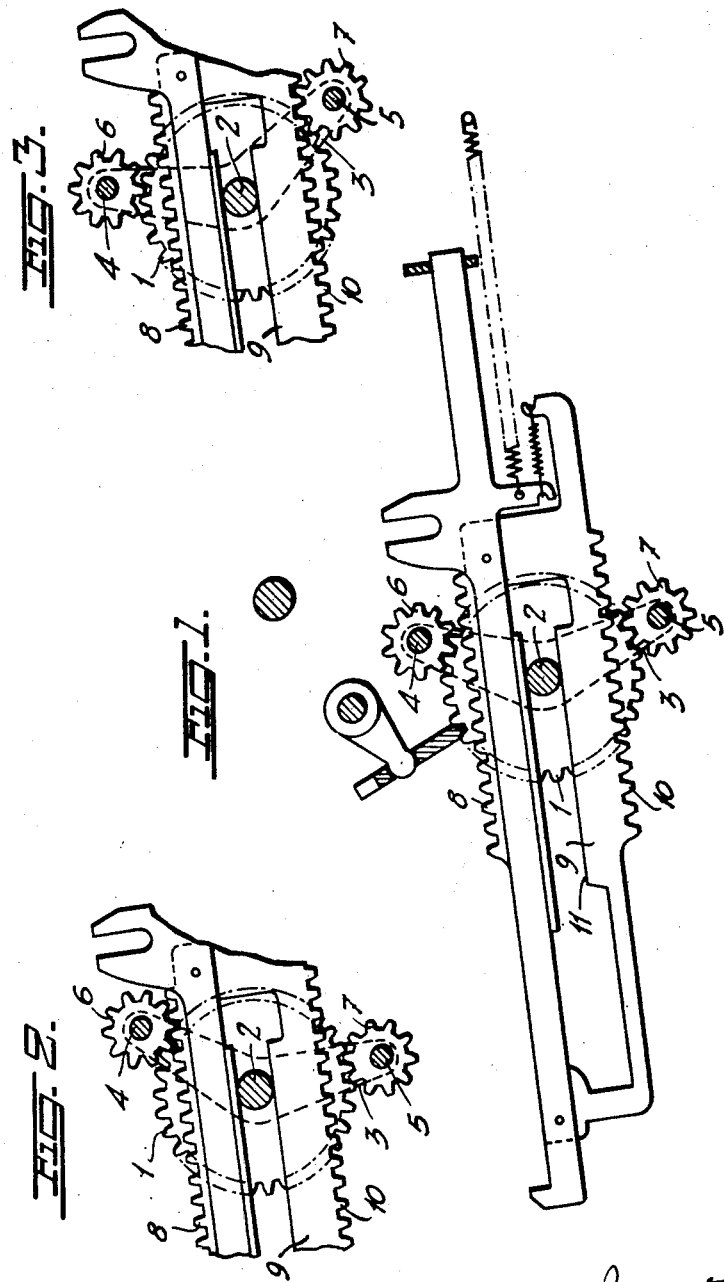
Inventor
Gustaf Vilhelm Liljeström
by Jarvis C. Marble
his attorney

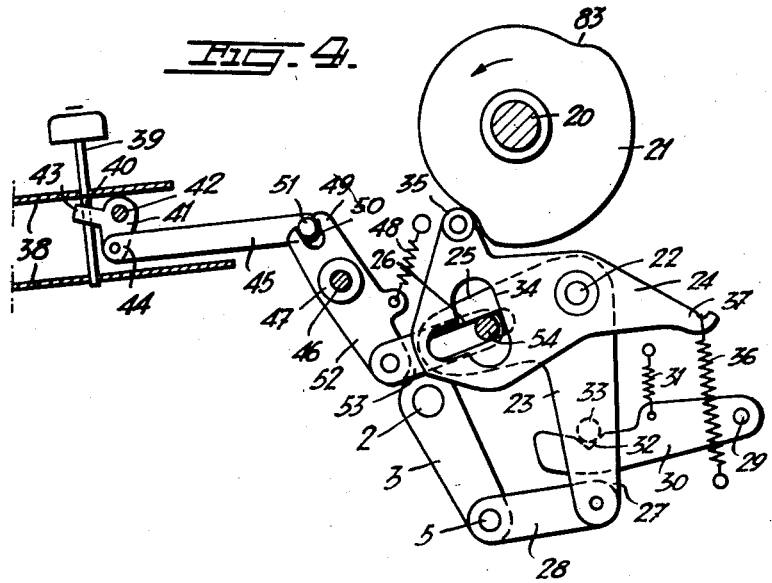
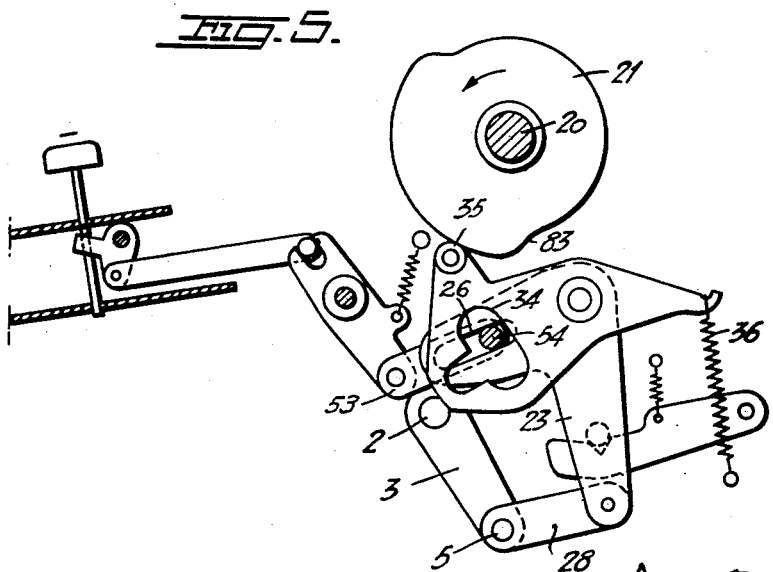

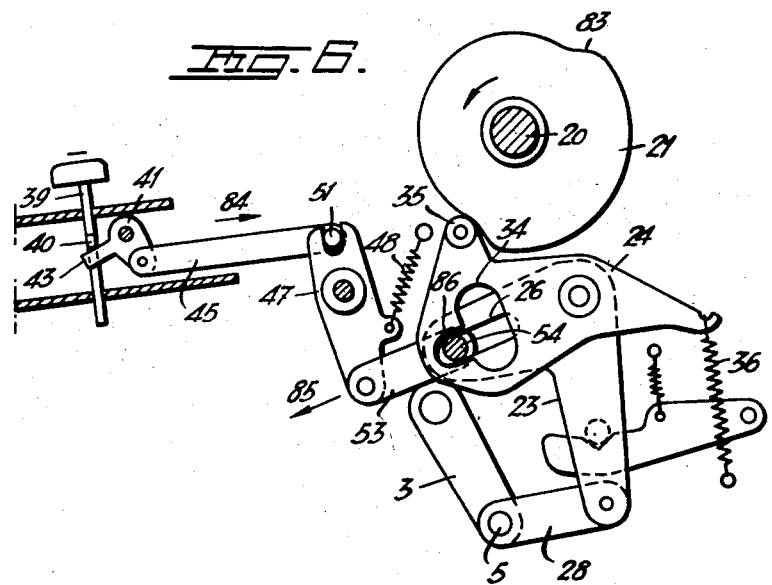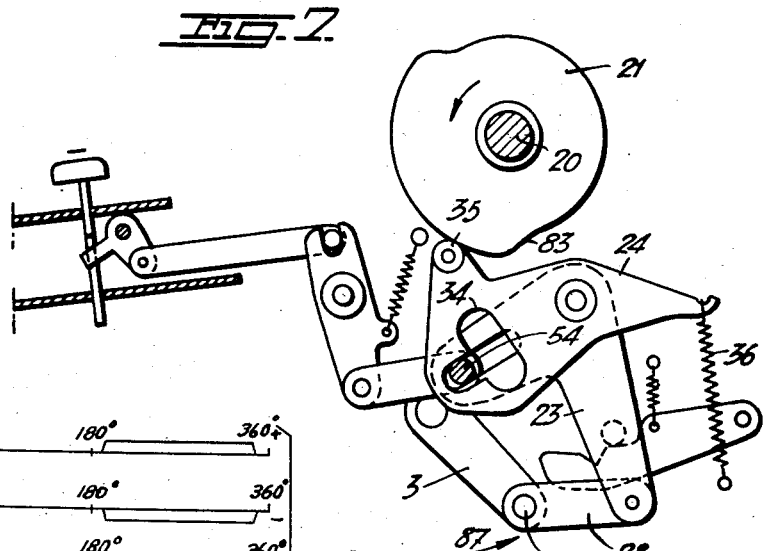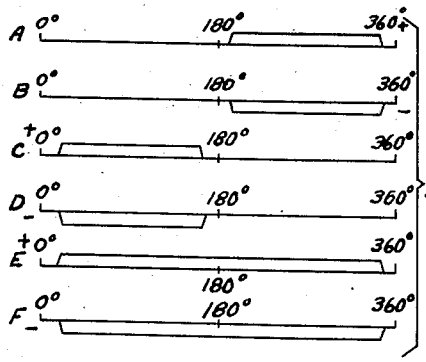

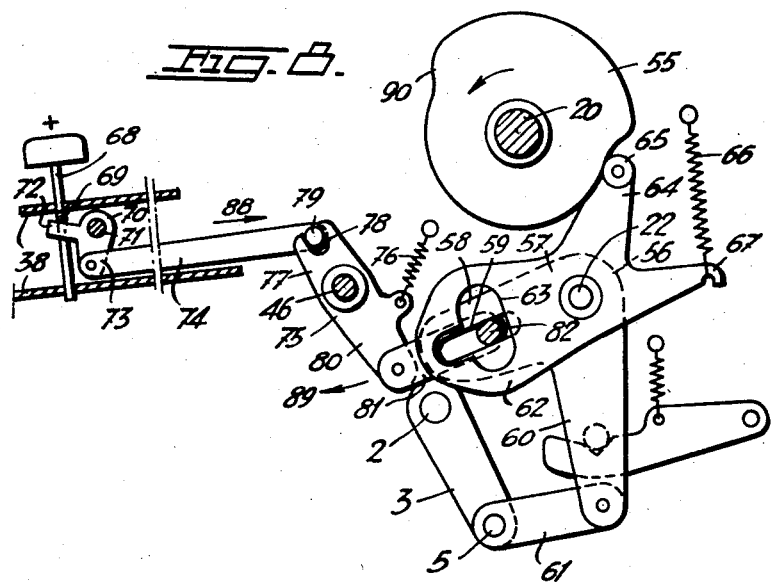
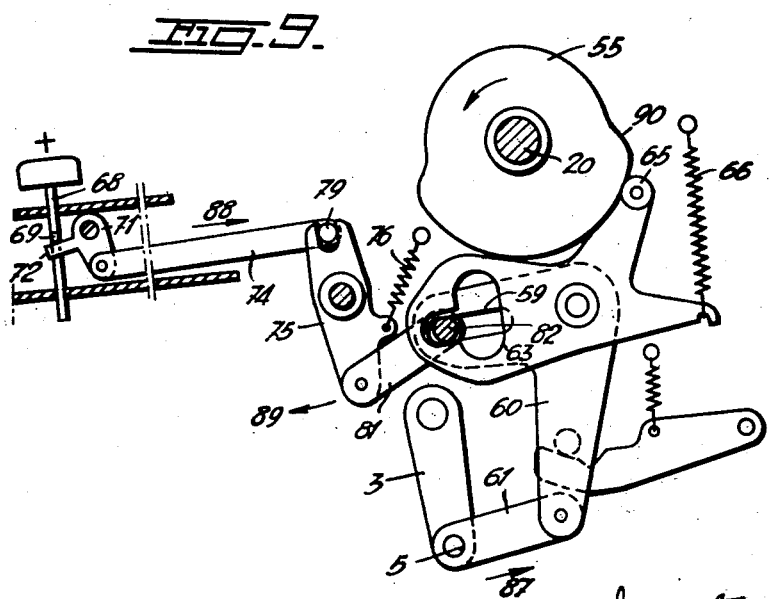

Patented Dec. 25, 1951

2,580,031

UNITED STATES PATENT OFFICE 2,580,031

ACCUMULATOR ENGAGING MECHANISM FOR ADDING AND SUBTRACTING MACHINES

Gustaf Vilhelm Liljeström, Atvidaberg, Sweden, assignor to Aktiebolaget Åtvidabergs Industries, Atvidaberg, Sweden, a joint-stock company of Sweden Application February 18, 1948, Serial No. 9,058
In Sweden October 1, 1946

Section 1, Public Law 690, August 8, 1946
Patent expires October 1, 1966

3 Claims. (Cl. 235—60)

1

In adding and accounting machines it is customary to enter (add or subtract) the different items into register or totalizer wheels, which may be brought to mesh with, or be disconnected from driving members which have the form of reciprocating toothed racks or rockable toothed sectors, or the like. These connecting and disconnecting motions occur during different intervals of time in the machine, depending on what kind of operations is to be done. As a rule the machines now on the market have these motions of connection and disconnection prepared by a readjustment of different hooks and arms, which are set from the key-board of the machine. The force necessary for effecting such connecting motion has to be effected by the operator, when he depresses the proper operating key. In addition, the mechanism of hooks and arms is comparatively complicated, and consequently expensive to manufacture and liable to get out of order and to cause errors of calculation. For these reasons it is highly desirable to simplify the construction, and to modify it in such manner that the muscular effort to be made by the operator is substantially reduced.

The purpose of this invention is to create a simplified and easily handled operating device to perform both of the above mentioned connecting and disconnecting motions. An essential feature of the invention is that the energy necessary for effecting these functions is taken off from the driving shaft of the machine.

With these and other objects in view the invention refers to an arrangement in adding, accounting or similar machine, in which for the various functions (kinds of operations) the wheels of a register or totalizer are engaged with (coupled to) driving members by means of energy taken from the driving shaft of the machine characterized in that on said driving shaft of the machine cam disks are provided, one for each function (kind of operation) concerned, each of said cam disks being arranged to actuate an individual motion-transferring mechanism, which normally is at rest but is set to its operative position, when the corresponding operating key is depressed.

This renders it possible to use very simple constructional elements, and moreover, the same elements can be used in the motion-transferring elements associated with the various operating keys. Obviously, this means that both the manufacture of these elements, and their mounting in the machine are simplified. And the simple construction is much more reliable than those heretofore known.

2

Other objects and characteristic features of the invention will be evident from the following specification and claims.

By way of example the invention is shown in the drawings as applied to a machine of the type, described in the Swedish Patent No. 91,280 (British Patent No. 479,234). Fig. 1 in the drawing shows a side view of a driving member, a totalizer wheel and the coupling elements between them according to the embodiment described in said Swedish patent; Fig. 1 shows the device in its position of rest. In Figs. 2 and 3 certain parts of the device according to Fig. 1 are shown as set for addition and subtraction, respectively. Figs. 4-7 show the cam disk for subtraction together with its cooperating actuating mechanism in different positions. Figs. 8 and 9 show the cam disk for addition together with its cooperating actuating mechanism in two different positions. Fig. 10 shows examples of different functions (modes of operation) which may occur in an adding machine of the type in question.

The mechanism shown in Figs. 1-3 is described in the Swedish Patent No. 91,280 (British Patent No. 479,234); and I signifies a wheel in the totalizer (register) of the machine, the other wheels of which are not shown. The totalizer wheels are rotatably journalled on a shaft 2, fixed in the machine frame. Besides the wheels of the totalizer this shaft also carries a couple swingably geared bell-crank levers or arms 3, which are arranged on both of the end sides of the totalizer and are rigidly interconnected by means of two shafts 4 and 5, parallel to the shaft 2. The shaft 4 which in the drawing is shown above the totalizer wheels 1, carries a number of small toothed wheels 6 in mesh with their respective totalizer wheels, and the shaft 5 below said totalizer wheels carries a number of small toothed wheels, also in mesh with their respective totalizer wheels. Each individual gear wheel 6 is also adapted to mesh with an upper line of teeth 8 on a toothed slide or rack 9, adjacent to said totalizer wheel; and the corresponding wheel 7 is adapted to mesh with a lower row of teeth 10 on the same rack. The racks 9 are mounted on the shaft 2 in such a manner that they are displaceable at right angles to the same and to this end each slide has an elongated slot 11 through which the shaft 2 extends.

In an operation of addition the lever 3 is swung, from its neutral position shown in Fig. 1 clockwise until the coupling wheel 6 becomes enmeshed with the upper row of teeth 8, as shown in Fig. 2.

In an operation of subtraction the lever 3 is swung from its neutral position in Fig. 1 in counterclock-wise direction, until the coupling wheel 7 meshes with the lower line of teeth 10, as shown in Fig. 3.

The actuating members for these levers 3 will be described in the following:

In Fig. 4 the driving shaft 20 of the machine is shown, which in well-known manner, after any of the starting keys has been depressed, always rotates one complete revolution and then stops in its starting position (full-cycle position) again. On the driving shaft 20 a cam disk 21 is secured and on the machine frame a pin 22 is fixed on which the two bell crank levers or swinging arms 23 and 24 are rockably journalled, close to each other. One leg 25 of the lever 23 is provided with an oblong slot 26 and its other leg 27 is articulately connected with a link 28. The other end of said link is pivoted on the shaft 5. Around a stud 29 secured to the machine frame an arm 30 is pivoted which tends to rock clock-wise under the action of a tension spring 31. A recess or notch 32 in the arm 30 engages a pin 33 fixed to the leg 27 and is holding said leg and thereby also the arm 23 in neutral position. The lever 24 is provided with a T-shaped slot 34 and carries at one end a roller 35, which is held in contact with the cam disk 21 under the actuation of a spring 36, secured to the other end 37 of the lever 24. In the key board 38 a key 39 is displaceably arranged, which has an abutment 40. A bell-crank lever or rocking piece 41 is pivoted on a fixed pin 42 and is so designed that its projection 43 reaches in under the abutment 40 while its other projection 44 is pivotally connected to a link 45. Around a stationary pin 46 an arm 47 is swingably journalled which tends to rock counterclockwise under the actuation of a spring 48. In the upper end 49 of the arm 47 there is an oblong recess 50 which engages a pin 51 on the link 45. The lower end 52 of the arm 47 is articulately connected with the link 53 to the other end of which a pin 54 is secured. This pin engages the slot 26, in which it is displaceable, and the pin is so long, that it also extends through the T-shaped slot 34 in the lever 24. The mechanism just described serves to rock the lever 3 counterclock-wise to bring the toothed wheels 7 into engagement with the toothed slides 10, as shown in Fig. 3 and will be described below.

In order to rock the lever 3 clock-wise from its neutral position to a position according to Fig. 2 the actuating members have been designed according to the following specification; see Figs. 8 and 9.

On the driving shaft 20 of the machine also a cam disk 55 is secured and, on the pin 22, stationary in the machine frame, two bell crank levers or swinging arms 56 and 57 are pivoted close to each other. One leg 58 of the lever 56 is provided with an oblong slot 59 and its other leg 60 is articulately connected with a link 61, the other end of which is pivoted on the shaft 5. One leg 62 of the lever 57 has a T-shaped slot 63 and on its other leg 64 a roller 65 is mounted which is held in engagement with the cam disk 55 under the actuation of a tension spring 66 secured to a hook 67 of the lever 57. In the key board 38 a key 68 is displaceably arranged, which has an abutment 69. A bell-crank lever or rockable piece 70 is pivoted on a fixed pin 71 and so designed, that its projection 72 engages the abutment 69 from below, while its other projection 73 is articulately connected with a link 74. On the pin 46 mentioned above an arm 75 is pivoted, which is drawn counterclock-wise by a tension spring 76. The upper end 77 of the arm 75 has an oblong recess 78 engaging a pin 79 on the end of the link 74. The lower end 80 of the arm 75 is articulately connected with the link 81 to the other end of which a pin 82 is secured. This pin engages the slot 59 and slides therein, and it is so long that it also passes through the T-shaped slot 63 in the adjacent lever 57.

The devices described function as follows:

When the machine is in its position of rest, the described members are in their positions shown in Figs. 1, 4 and 8. Assuming that the machine first makes one idle revolution, in which the driving shaft 20 is started and rotates the cam disk 21 one revolution counterclock-wise. The acclivity (or cam) 83 of the cam disk 21 will then press against the roller 35 and swing the lever 24 counterclock-wise into its position shown in Fig. 5. Because the aperture 34 in the lever 24 is T-shaped, this lever 24 does not actuate the pin 54 and consequently the lever 24 follows the motion of the cam disk 21 without actuating any other detail in the mechanism.

When a negative item is to be entered into the totalizer wheel the minus key 39 in Fig. 6 is depressed by the operator. Then the abutment 40 of the projection 43 presses down the projection arm 41 rocking it counterclock-wise. This causes the link 45 to be displaced in the direction of the arrow 84, and thus the pin 51 rocks the arm 47 clock-wise against the actuation of the spring 48. Consequently the arm 47 draws the link 43 in the direction of the arrow 85 and the pin 54 slides in the oblong slot 26 in the lever 24, until it strikes the end portion 86 of (the stem of) the T-shaped slot 34. Now the machine starts due to the depression of the subtraction key; when the acclivity 83 of the cam disk 21 passes the roller 35, the lever 24 is swung counterclock-wise. Because the stem end portion 86 of the T-shaped track 34 now engages the pin 54, said pin follows the rocking motion of the lever 24 and thus moves the parts of the mechanism into the relative positions shown in Fig. 7. Because the pin 54 also passes through the slot 26 of the lever 23, said lever also follows said rocking motion and by means of the link 28 rocks the arm 3 in the direction of the arrow 87, Fig. 7. This causes the coupling wheel 7 to roll on the totalizer wheel 1, until said wheel 7 is brought in mesh with the row of teeth 10, as shown in Fig. 3. When now at the operation of the machine the rack 9 is displaced in well-known manner, the desired item is entered into the wheel of the totalizer, which is then rotated in the minus direction. The spring 36 then returns the parts to their position of rest under the control of the cam disk 21.

An operation of addition, Fig. 8, is performed in an analogous manner, but for moving the lever 3 in the direction opposite to that indicated by the arrow 87, the arm 57 has received a different design, as shown in Fig. 8. When the operator depresses the key of addition 68, the abutment 69 presses down the projection 72 and rocks the lever 71 counterclock-wise, thus displacing the link 74 in the direction of the arrow 88, Fig. 8. The pin 79 hereby rocks the lever 75 in a clock-wise direction against the actuation of the spring 76. The link 81 is displaced in the direction of the arrow 89, while its pin 82 is sliding in the slot 59 in the lever 56, until it enters the middle or stem portion of the T-shaped aperture 63. When now the machine starts (due to the depression of the addition key) and thus the acclivity 90 on the cam disk 55 passes the roller 65, the arm 57 is swung clock-wise and its T-shaped aperture 63 now moves the pin 82 causing the parts of the mechanism to assume the relative positions, shown in Fig. 9. The pin 82 also rocks the lever 60, which via the link 61 rocks the arm 3 in the direction opposite to that indicated by the arrow 87. At this, the coupling wheel 6 rolls on the wheel of the totalizer, until said wheel 6 is brought in mesh with the row of teeth 8, as shown in Fig. 2. At the operation of the machine the rack 9 is thereafter displaced in well-known manner, thus causing the desired positive item to be entered into the totalizer wheel, then rotating in the adding direction. Afterwards the spring 66 restores the parts to their position of rest, under the control of the cam disk 55.

Through the mechanism described the operator is essentially relieved from muscular effort for performing the coupling operation; he only has to set the pin 54 and 82, respectively, to a preparatory position, whereafter the driving shaft effects the coupling functions proper and renders all mechanical energy required for this purpose. It is evident from the specification above, that the necessary constructional elements are comparatively few and rock on stationary shafts; thus the mechanism has a simple and inexpensive construction and is simultaneously reliable and safe in operation.

The invention has been described above as applied to an adding machine according to the Swedish Patent No. 91,280-British Patent No. 479,234. Of course the invention is not limited to its use in such machines. On the contrary, the invention can be applied generally to all totalizer constructions having coupling mechanisms between the totalizer wheels and the driving members for functions (kinds of operations) of different kinds. Fig. 10 illustrates diagrammatically a few examples of the different functions, that may be used in an adding machine. In this figure, a complete revolution of the driving shaft 20 is represented by straight lines marked at one end with 0° and at the other end with 360° and halfway 180°. The parts of these lines which are elevated above (positive direction) or sunk below (negative direction) the straight basic line represent the angular lengths of the cams and their relative position during the revolution of the driving shaft. The positive and the negative directions of rotation have been described above. The letters in Fig. 10 indicate the functions concerned, that is to say:

A=addition
B=subtraction
C=positive total
D=negative total
E=positive sub-total
F=negative sub-total.

Having now particularly described and ascertained my said invention, I declare that what I claim is:

1. In an adding, accounting and similar machine, in combination, operation selection keys, a driving shaft, a register with totalizer wheels, a motion transfer mechanism between said driving shaft and said totalizer wheels of said register, said motion transfer mechanism comprising a plurality of cam disks arranged on said driving shaft, one cam disk corresponding to each operation selection key, each of said cam disks being arranged to actuate a corresponding motion transfer device, normally at rest but settable to operative position by depression of said corresponding operation selection key, each of said motion transfer devices comprising two levers rockable on a common stationary fulcrum, one of said levers being actuated upon by the cam disk and swinging to and fro when the driving shaft rotates, said lever being releasably connected with the other one of said levers by means of a connecting pin settable to two different positions by means of the corresponding operation selection key at the depression of said key, said pin sliding in the stem part of a T-shaped slot in the lever actuated by the cam disk, said pin also sliding in a slot in the other one of said levers, the cross part of said T-shaped slot being so arranged that when said operation selection key is in its normal position, the pin is situated in the cross part of the T-shaped slot, thereby permitting the cam actuated lever to swing to and fro while the other lever is at rest, said pin being arranged to enter the end of the stem part of the T-shaped slot upon the depression of said operation selection key, thereby connecting the levers to rock in unison around their common fulcrum under the actuation of said cam disk, the unit of levers thereby actuating said register.

2. In an adding, accounting and similar machine, in combination, operation selection keys, a driving shaft, a register with totalizer wheels, a motion transfer mechanism between said driving shaft and the totalizer wheels of said register, said motion transfer mechanism comprising a plurality of cam disks arranged on said driving shaft, one cam disk corresponding to each operation selection key, each of said cam disks being arranged to actuate a corresponding motion transfer device, normally at rest but settable to operative position by depression of said corresponding operation selection key, each of said motion transfer devices comprising two levers rockable on a common stationary fulcrum, one of said levers being actuated upon by said cam disk and swinging to and fro when the driving shaft is rotated, said one lever being releasably connected with the other of said levers by means of a connecting pin, said connecting pin being via a link carried by an arm rockable on a stationary pivot, said arm being connected with the corresponding operation selection key by means of a link, said connecting pin being settable to two different positions by means of said corresponding operation selection key upon the depression of said key, said connecting pin sliding in the stem part of a T-shaped slot in the said one lever, said connecting pin also sliding in a slot in the said other lever, the cross part of said T-shaped slot being so arranged that when the operation selection key is in its normal position, said connecting pin is situated in the cross part of the T-shaped slot, thereby permitting the said one cam actuated lever to swing to and fro while the said other lever is at rest, while upon depression of said operation selection key said connecting pin enters the end of the stem part of the T-shaped slot, thereby connecting the said one and said other levers to rock in unison around their common fulcrum under the actuation of said cam disk, the unit of levers thereby actuating said register.

3. In an adding, accounting and similar machine, in combination, operation selection keys, a driving shaft, a register with totalizer wheels, a motion transfer mechanism between said driving shaft and the totalizer wheels of said register, said motion transfer mechanism comprising a number of cam disks, arranged on said driving shaft, one cam disk corresponding to each operation selection key, each of said cam disks being arranged to actuate a corresponding motion transfer device, normally at rest but settable to operative position by depression of said corresponding operation selection key, each of said motion transfer devices comprising two levers pivoted on a stationary shaft in the machine, one of said levers being actuated by the cam disk and being also actuated by a spring to automatically return after the completion of an operation of the machine, said lever swinging to and fro when the driving shaft is rotated, said lever also being releasably connected with the other of said levers by means of a connecting pin, said pin being via a link carried by an arm, rockable on a stationary pivot, said arm being connected with the corresponding operation selection key by means of a link, said connecting pin being settable to two different positions by means of said corresponding operation selection key, said connecting pin sliding in the stem part of a T-shaped slot in the one lever upon depression of said operation selection key, said connecting pin also sliding in a slot in the other one of said levers, the cross part of said T-shaped slot being so arranged that when the operation selection key is in its normal position, the connecting pin is situated in the cross part of the T-shaped slot, thereby permitting the said one lever to swing to and fro while the said other lever is at rest, said connecting pin being arranged to enter the end of the stem part of the T-shaped slot upon depression of the corresponding operation selection key, thereby connecting the said one and said other levers and to rock in unison around their common fulcrum under the actuation of said cam disk, the unit of levers thereby actuating said register, and a ratchet device arranged to yieldingly latch in a neutral position said other lever which is releasably connected to the said one lever.

GUSTAF VILHELM LILJESTRÖM.

REFERENCES CITED

The following references are of record in the file of this patent:

UNITED STATES PATENTS

| Number | Name | Date |
|---|---|---|
| 1,471,684 | Russell | Oct. 23, 1923 |
| 2,052,905 | Strum | Sept. 1, 1936 |
| 2,124,177 | Lasker et al. | July 19, 1938 |
| 2,181,975 | Lee | Dec. 5, 1939 |
| 2,194,270 | Sundstrand | Mar. 19, 1940 |
| 2,360,005 | Mehan | Oct. 10, 1944 |
| 2,361,714 | Sundstrand | Oct. 31, 1944 |
| 2,443,652 | Carey et al. | June 22, 1948 |

FOREIGN PATENTS

| Number | Country | Date |
|---|---|---|
| 479,234 | Great Britain | Feb. 2, 1938 |
| 651,567 | Germany | Oct. 15, 1937 |
| 681,954 | Germany | Oct. 7, 1939 |
| 91,985 | Norway | Dec. 16, 1947 |
| 4,714/47 | Denmark | Dec. 18, 1947 |
| 9,812/47 | Finland | Dec. 23, 1947 |
| | Australia | No information |
| 546,786 | France | Dec. 24, 1947 |
| 476/28 | Italy | Dec. 20, 1947 |
| 29,883 | Switzerland | Dec. 20, 1947 |
| P. 7,618/47 | Czechoslovakia | Dec. 30, 1947 |
| 372,934 | Belgium | Jan. 1, 1948 |
| 137,450 | Holland | Dec. 23, 1947 |
| P. 71,955 | Poland | Dec. 17, 1947 |
| | British Indies | No information |
| 33,468/47 | Great Britain | Dec. 18, 1947 |
| 45,227 | Brazil | Dec. 24, 1947 |
| | Canada | No information |
| | Mexico | No information |
| | Argentina | No information |
| 10,199/47 | Turkey | Dec. 24, 1947 |
| 181,295 | Spain | Dec. 30, 1947 |
| 3,374/47 | South Africa | Dec. 18, 1947 |